Patented Sept. 29, 1953

2,653,956

UNITED STATES PATENT OFFICE 2,653,956

DRYING OIL COMPOSITIONS

Edwin G. Marhofer, Fredonia, Kans., and John C. Hillyer, Bartlesville, Okla., assignors to Phillips Petroleum Company, a corporation of Delaware No Drawing. Application August 16, 1948, Serial No. 44,596

18 Claims. (Cl. 260—407)

This invention relates to drying oil compositions and more particularly to a method for producing drying oils from open chain diolefins and unsaturated glyceride oils.

The widespread use of drying oils in the production of coating compounds, paints, varnishes, floor coverings, and the like has created a demand for these products which often exceeds the available supply even when recourse is made to foreign sources. The semi-drying oils, such as cottonseed oil, soy bean oil, corn oil, fish oil, and the like, would provide abundant source materials for these and similar uses, if it were possible to improve their drying properties to a sufficient degree. In the past, certain processes have been developed for the condensing of drying and semi-drying oils with cyclic diolefins, such as cyclopentadiene, to improve their drying characteristics. However, cyclopentadiene must, in most instances, be produced by cracking its polymers by expensive and laborious methods. Moreover, the degree of improvement secured by such treatment is usually limited. More recently a process has been disclosed wherein open chain diolefins are condensed with drying or semi-drying oils by which substantial improvement in their drying characteristics are effected. While this process, described in copending application, Serial No. 778,720, filed October 8, 1947 now Patent No. 2,581,413, has numerous advantages and provides high quality products, it involves the treatment of the entire volume of the oil in high pressure equipment.

It is the object of this invention to provide improved drying oils and a method for preparing said drying oils.

It is a further object of this invention to provide a drying oil by incorporating in an unsaturated glyceride oil a minor proportion of an activating substance produced from an open chain diolefin and to provide an improved method for incorporating said activating substance in the glyceride oil.

Additional objects will appear from the disclosure which follows.

We have now discovered a process whereby drying and semi-drying oils can be converted to compositions having superior drying characteristics by the action of minor amounts of an activating substance prepared from open chain diolefins. This activating material is produced by thermal or catalytic condensation of an open chain diolefin such as butadiene, isoprene, piperylene, and the like to form a viscous, nonrubberlike oil.

According to our process, the activating substance is added to an unsaturated glyceride oil of the drying or semi-drying type in an amount which will be between 2 and 20 per cent of the oil by weight, and thoroughly mixed therewith. The mixture is then heated at from 550 to 600° F., preferably from 570 to 590° F., for from two to six hours, during which time significant changes in the drying characteristics of the oil are effected and the desired viscosity is attained.

The products obtained by our process dry quickly to smooth, impervious films when exposed to air. The drying properties exhibited by these compositions are far superior to those which might be expected were the product a mere mixture, for, although the activating agents of our invention have valuable intrinsic drying properties, the quantity employed comprises but a small proportion of the total composition. Thus it is impossible to account for the unexpectedly rapid drying rate so obtained on a basis of simple addition of the drying characteristics of the components, and it would appear that the activator must operate either synergistically with the oil or enter into a chemical combination therewith to provide a composition of new and superior drying properties.

The activating agents of our invention are prepared by the condensation of open chain diolefins under conditions such that the products are of lesser molecular weight than usually associated with the heavy polymers used in synthetic rubber manufactures and are, on the other hand, more viscous than the dimer. One suitable method for preparing such activating agents is as follows: A solution of butadiene in a suitable hydrocarbon solvent such as benzene, toluene, xylene or the like, is contacted with a finely divided alkali metal catalyst at a temperature in the range of 140 to 230° F. As the polymerization reaction takes place, the pressure will decrease; when the pressure assumes an approximately constant value, it can be assumed that the polymerization has gone to completion. Any appropriate method such as washing with water, etc. may be employed to destroy the sodium catalyst prior to stripping out the solvent. The oily polymer remains. Another method, comprising thermal treatment of open chain diolefins in a medium comprising a paraffinic hydrocarbon at temperatures below that at which condensation normally occurs, yields products which can be advantageously used in our process. This method is described in an abandoned copending application, Serial No. 784,762, filed November 7, 1947.

Still another means for producing our activating substance lies in the condensation of a suitable diolefin in the presence of finely divided alkali metal catalysts. When operating in this manner it is necessary that the viscosity of the product be held at a suitable level, generally from 20 to 150 poises at 77° F. This control of viscosity may be effected either by increasing the quantity of catalyst employed or by the addition of a suitable chain-breaking agent such as 1,2-butadiene to the product. A detailed description of one method for the condensation of diolefins in this manner is described in copending application Serial No. 765,639, filed August 1, 1947 now Patent No. 2,559,947.

Still another means for producing our activating agents lies in preparing low molecular weight, liquid polymers in aqueous emulsions by processes and formulae closely resembling those used in synthetic rubber manufacture. In practicing the technique of polymerizing diolefins to high polymers, it is customary to add to the emulsion of the monomers in aqueous soap solution a small quantity of a substance known as a "modifier," usually selected from the class of aliphatic mercaptans of molecular chain length of about $C_{10}$ to $C_{16}$. These compounds function to control the molecular weight of the polymer formed, its degree of cross linking, etc., and thus to control its consistency or viscosity. When the active concentration of modifier at the reaction locus is and remains too great at the polymerization locus, an "overmodified" polymer results, which is of low molecular weight, and in some instances even liquid in consistency, and generally regarded as unsuitable for synthetic rubber uses. Such polymers are, however, particularly suitable for the purpose of our invention. While possessing little, if any, drying properties, they serve as excellent activators for glyceride drying oils when used in our process. However, in such operations it is the usual practice to prepare copolymers rather than simple polymers. These copolymers are usually formed by reacting the conjugated diolefin, such as 1,3-butadiene, with a compound containing the vinyl group such as styrene. Such butadiene-styrene copolymers are well known and very suitable for use in our process.

These polymers may be produced by the emulsion polymerization of mixtures of co-monomers comprising 50 to 100 parts by weight of 1,3-butadiene and 50 to 0 parts by weight of styrene at a temperature in the range of 32 to 160° F. Catalysts, such as hydrogen peroxide, potassium persulfate, organic hydroperoxides or the like, may be used in the emulsion polymerization processes. Emulsifying agents such as soaps, alkyl aryl sulfonates, alcohol sulfates, or other suitable materials may be employed.

The diolefins used include isoprene, dimethyl butadiene, piperylene, and the like, as well as the previously mentioned 1,3-butadiene. The vinyl compounds used as co-monomers may include vinyl pyridenes, acrylonitrile, methacrylonitrile, styrene, α-methyl styrene, chlorostyrene, and the like, and will contain a terminal methylene group, illustrated by the following formula:

$$CH_2=C<$$

Although we have described these emulsion polymerized materials with particular reference to copolymers, the use of suitably modified simple polymers, such as polybutadiene, is likewise applicable to our process and such method of operation is within the scope of our invention.

Included also in our process is the use of copolymers of diolefins with vinyl compounds prepared by sodium catalyzed mass polymerization methods as described above. In fact, the formation of butadiene-styrene copolymers by this technique is common practice, and soft materials suitable for our process can be easily produced by such procedure.

From whatever source our activating materials may be prepared, it is essential that they be oil soluble. For example, polymers formed without modification or in such manner as to give high molecular weight products are often characterized by insolubility and are thus unsuitable, as are also polymers produced as "gels" which do not dissolve or swell in benzene. Polymers prepared by the conventional technique, using the optimum quantity of modifier for the production of synthetic rubber are substantially gel free and dissolve in benzene but are substantially insoluble in glyceride drying oils and thus are likewise unsuitable for our process. However, by increasing the amount of modifiers, thus diminishing the molecular weight until the polymer becomes a viscous oil, increasing solubility in glyceride oils is obtained. Thus, by increasing the quantity of tertiary $C_{12}$ mercaptan from the value of about 0.35 part per 100 parts of polymer usually employed in synthetic rubber manufacture to from 5 to 25 parts per 100 parts of polymer, liquid polymers possessing very high to complete solubility in glyceride oils are obtained.

However, since such polymers are not homogeneous and contain molecules distributed over a considerable weight range, there is usually found a trace of insoluble material which imparts turbidity to the glyceride oil which would be undesirable in the finished films produced by the oil. We have found that one convenient method for eliminating this insoluble portion is to mix the polymer with the glyceride oil prior to any refining step which would normally be applied to the glyceride oil. For example, linseed and soy bean oils are customarily refined by treatment with aqueous caustic solutions, which separate certain impurities from the oil along with the aqueous layer. When this refining step is applied to the mixed polymer and oil, the trace of insoluble matter is removed in the same manner. The mixture is then heat treated to effect the desired interaction of the activator with the oil. Another procedure which can be followed involves refining the polymer by dissolving in hexane, removing insoluble material and recovering the dissolved portion for use in the activation process of our invention.

While we have found that the above described methods provide products suitable for use as activating agents in our process, other procedures may be employed when desired, among which may be mentioned the use of liquid type catalysts such as compositions of $BF_3$ with water. By whatever method prepared, the material should be soluble in the glyceride oil, be free from contaminating impurities, and will preferably have a viscosity in the aforementioned range of from 20 to 150 poises at 77° F., and will be of predominantly open-chain structure when prepared as herein set forth.

The method of our invention can be employed for the production of drying oil compositions from unsaturated glyceride oils of the types generally known as drying and semi-drying oils, including linseed oil, soy bean oil, corn oil, cottonseed oil, fish oils, and the like. The activating agents used can be prepared from open chain diolefins such as butadiene, isoprene, piperylene, and the like. We have generally preferred to employ the condensation product of butadiene which can be manufactured from abundant and readily available materials by well known methods. The equipment and operations involved are simple, even for very large scale operations, thus facilitating the production of valuable and much needed drying oil compositions at economically significant costs.

*Drying test methods used in the following examples*

100 grams of the bodied oil were dissolved in 60 grams of varnish makers and painters naphtha. To this was added cobalt and lead driers (naphthenates or linoleates) in the amount to provide 0.024 per cent cobalt and 0.048 per cent lead. The mixture was then stirred thoroughly and spread on glass test plates in uniform layers and exposed to the atmosphere at room temperature. "Set Dry" is the time required for the formation of a film which is sticky to the fingers but is not removed on contact. "Rub Dry" is the time required at which the film is not broken upon rubbing, although still sticky. "Final Dry" is the time required for the formation of a film which when pressed firmly with the fingers and then polished, leaves no prints.

EXAMPLE I

An activating agent was prepared by condensing butadiene in the presence of a sodium catalyst under conditions such that a viscosity of Z-1 on the Gardner scale was obtained. A portion of this activator was combined with refined soy bean oil in a ratio of 24 parts of activator to 136 parts of oil. The product was then heated at 580–590° F. for 2.25 hours to produce a viscosity of Z-2 on the Gardner scale. Drying tests were carried out on the composition so formed and compared with those of bodied soy bean oil without the activator. Results of the tests are shown below.

|  | Activated Composition | Soy Bean Oil |
|---|---|---|
| Set Dry (Hours) | 3.0 | 48.0 |
| Rub Dry (Hours) | 6.0 |  |
| Final Dry (Hours) | 16.0 |  |
| Iodine Number | 112.8 | 82.3 |
| Gardner Color | 8 | 10 |

EXAMPLE II

An activating agent was prepared by mixing 50 pounds of butadiene with 27 pounds of n-hexane and heating in a closed reactor at 300° F. for 13 hours. The reactor was vented to a condenser to remove and recover unreacted butadiene which was returned to storage for recycling to a subsequent batch. The residue was distilled at atmospheric pressure to remove the n-hexane solvent at about 183° F. and a small quantity of butadiene dimer (less than one pound) boiling below 265° F. The kettle product was a clear, colorless, viscous oil.

Eight pounds of the activator thus prepared were stirred with 220 pounds of soy bean oil in a vat and heated to a temperature of 580–590° F. for about 3.5 hours to reach a viscosity of Z-2 on the Gardner scale. Drying tests were carried out on this oil and compared with values obtained on soy bean oil without the activator. The results are tabulated below.

|  | Activated Composition | Soy Bean Oil |
|---|---|---|
| Set Dry (Hours) | 3.5 | 48.0 |
| Rub Dry (Hours) | 18.0 |  |
| Iodine Number | 94 | 85 |

EXAMPLE III

An activating agent was prepared by thermal treatment of butadiene as described in Example II. Eleven grams of this substance were combined with 89 grams of linseed oil and heated at 580–590° F. for 1.50 hours to produce a viscosity of Z-2 on the Gardner scale. A parallel run was carried out as a control using linseed oil that had been bodied for 4.25 hours. The resulting materials were tested on glass strips to determine drying characteristics. Data on these tests are shown below.

|  | Activated Composition | Linseed Oil |
|---|---|---|
| Set Dry (Hours) | 1.5 | 2.6 |
| Rub Dry (Hours) | 3.0 | 4.5 |
| Final Dry (Hours) | 14.0 | 22.5 |
| Iodine Number | 131.0 | 120.9 |
| Gardner Color | 10 | 7 |

EXAMPLE IV

An activating agent was prepared by sodium catalyzed treatment of butadiene as described in Example I. A composition comprising 15.5 parts of this product and 84.5 parts of fish oil was prepared and heated at 580–590° F. for 0.4 hour to produce a viscosity of Z-2 on the Gardner scale. A control run was carried out using untreated fish oil that had been bodied for 3.2 hours. Drying tests were carried out on the products, the results of which are shown in the following table:

|  | Activated Composition | Fish Oil |
|---|---|---|
| Set Dry (Hours) | 1.75 | 6.0 |
| Rub Dry (Hours) | 3.75 | 16.5 |
| Final Dry (Hours) | 16.00 | Sticky at 72. |
| Iodine Number | 117.5 | 94.5. |
| Gardner Color | 10 | 14. |

EXAMPLE V

An activating agent was prepared by polymerizing a mixture of 75 grams of 1,3-butadiene with 25 grams of styrene emulsified in 180 grams of water by the action of 5 grams of soap flakes, the formula being catalyzed by the action of 0.3 grams of potassium persulfate. Five grams in tertiary dodecyl mercaptan were added as a modifier. The mixture was agitated for 16 hours at 122° F. in sealed glass pressure bottles at the end of which time no unreacted butadiene was found when the bottles were opened. The polymers were coagulated by brine-acid solution and separated from the aqueous phase, washed and dried to provide 90 grams of soft, liquid polymer.

A 14.5 gram sample of this overmodified butadiene-styrene emulsion copolymer was thoroughly admixed with 145 grams of unrefined soy bean oil. Then milliliters of ten per cent sodium hydroxide solution were then added and the mixture stirred for five minutes at a temperature between 100 and 150° F. After settling the aqueous portion was separated to leave a clear, slightly yellow oil. Bodying was effected by heating in the range 580–590° F. for 3.33 hours. The resulting product had a viscosity of Z–2 on the Gardner scale and compared favorably in drying properties with linseed oil which had been bodied for 4.25 hours, as shown in the table following Example VII. The iodine number was 98.1 and color was 10.0 on the Gardner scale.

EXAMPLE VI

A 34 gram sample of an overmodified butadiene-styrene emulsion copolymer, prepared with 10 parts tertiary $C_{12}$ mercaptan modifier per 100 parts of monomer, according to the method of Example V, was added to 146 grams of soy bean oil. The thoroughly agitated mixture was refined and processed according to the procedure of Example V, after which the oil was separated and bodied to Z–2 viscosity on the Gardner scale by heating for 2.16 hours at 580–590° F. and was greatly improved in drying properties over soy bean oil which had been bodied for 5.75 hours. The product had an iodine number of 113.6 and a Gardner color of 9.0. Drying times are shown in the table following Example VII.

EXAMPLE VII

A 16.5 gram portion of an overmodified butadiene-styrene emulsion copolymer, prepared with 15 parts tertiary $C_{12}$ mercaptan modifier per 100 parts monomers, according to the process of Example V, was added to 100 grams of linseed oil and the mixture was processed according to the procedure of Example V. The oil was separated as before and bodied to Z–2 viscosity on the Gardner scale by heating for 1.8 hours in the range 580–590° F. The product had an iodine number of 128.5 and a Gardner color of 7. Drying times are shown in the table below.

[Drying Time Data]

|  | Activated Composition | | | Soy Bean Oil | Linseed Oil |
| --- | --- | --- | --- | --- | --- |
|  | Example V | Example VI | Example VII | | |
| Set Dry (Hours) | 6.5 | 3.10 | 1.8 | 48 | 2.6 |
| Rub Dry (Hours) | 22.3 | 9.0 | 3.5 |  | 4.5 |
| Final Dry (Hours) | 88.0 | 24.0 | 17.0 |  | 22.5 |

EXAMPLE VIII

A 14.5 gram sample of an overmodified butadiene-styrene emulsion copolymer was prepared with 5 grams tertiary $C_{12}$ mercaptan modifier per 100 grams monomer, refined with n-hexane to remove water, mercaptans soap, etc., and thoroughly admixed with 145 grams of refined soy bean oil by heating to from 100 to 150° F. for 5 minutes with stirring. This solution of copolymer in oil was then bodied to Z–2 viscosity on the Gardner scale by heating between 580 and 600° F. for 3.33 hours. Drying times of the product are compared with a bodied soy bean oil control below.

|  | Activated Composition | Soy Bean Oil |
| --- | --- | --- |
| Set Dry (Hours) | 6.5 | 48 |
| Rub Dry (Hours) | 22.3 |  |
| Final Dry (Hours) | 88.0 |  |

We claim:

1. A process for producing a drying oil composition, which comprises admixing a polymer consisting essentially of an unsaturated, predominantly open-chain liquid hydrocarbon polymer of an open chain conjugated diolefin, said polymer having a viscosity of from 20 to 150 poises at 77° F., with an unsaturated glyceride oil in the amount of 2 to 20 per cent by weight of said glyceride oil, and heating a resulting admixture at 550 to 600° F. for 2 to 6 hours.

2. A process for producing a drying oil composition, which comprises admixing a polymer consisting essentially of an unsaturated, predominantly open-chain, liquid hydrocarbon polymer of 1,3-butadiene having a viscosity of from 20 to 150 poises at 77° F. with soy bean oil in an amount between 2 and 20 per cent by weight of said soy bean oil, and heating a resulting admixture at 550 to 600° F. for 2 to 6 hours.

3. A process for producing a drying oil composition, which comprises admixing a polymer consisting essentially of an unsaturated, predominantly open-chain liquid hydrocarbon polymer of isoprene having a viscosity of from 20 to 150 poises at 77° F. with an unsaturated glyceride oil in an amount between 2 and 20 per cent by weight of said glyceride oil, and heating a resulting admixture at 550 to 600° F. for 2 to 6 hours.

4. A process for producing a drying oil composition, which comprises admixing a polymer consisting essentially of an unsaturated, predominantly open-chain liquid hydrocarbon polymer of piperylene having a viscosity of from 20 to 150 poises at 77° F. with an unsaturated glyceride oil in an amount between 2 and 20 per cent by weight of said glyceride oil, and heating a resulting admixture at 550 to 600° F. for 2 to 6 hours.

5. A process for producing a drying oil composition, which comprises admixing a polymer consisting essentially of an unsaturated, predominantly open-chain, liquid hydrocarbon polymer of an open chain conjugated diolefin having a viscosity of from 20 to 150 poises at 77° F. with soy bean oil in the amount of 2 to 20 per cent by weight, and heating a resulting admixture at 550 to 600° F. for 2 to 6 hours.

6. A process for producing a drying oil composition, which comprises admixing a polymer consisting essentially of an unsaturated, predominantly open-chain, liquid hydrocarbon polymer of an open chain conjugated diolefin having a viscosity of from 20 to 150 poises at 77° F. with linseed oil in the amount of 2 to 20 per cent by weight, and heating a resulting admixture at 550 to 600° F. for 2 to 6 hours.

7. A process for producing a drying oil composition, which comprises admixing a copolymer consisting essentially of an unsaturated, predominantly open-chain, liquid hydrocarbon copolymer of an open chain conjugated diolefin and a vinyl aromatic hydrocarbon, said co-polymer having a viscosity of from 20 to 150 poises at 77° F., with an unsaturated glyceride oil in the amount of from 2 to 20 per cent by weight of said glyceride oil, and heating a resulting admixture at 550 to 600° F. for 2 to 6 hours.

8. A drying oil composition of improved drying characteristics, which comprises a thermally treated admixture, said admixture consisting essentially of a polymer consisting essentially of an unsaturated, predominantly open-chain, liquid hydrocarbon polymer of an open chain conjugated diolefin, said polymer having a viscosity of from 20 to 150 poises at 77° F., and an unsaturated glyceride oil in an amount between 2 and 20 per cent by weight of said glyceride oil, wherein the thermal treatment of said admixture has been effected at 550 to 600° F. for 2 to 6 hours.

9. A drying oil composition of improved drying characteristics, which comprises a thermally treated admixture, said admixture consisting essentially of a co-polymer consisting essentially of an unsaturated, predominantly open-chain, liquid hydrocarbon co-polymer of an open chain conjugated diolefin and a vinyl aromatic hydrocarbon, said co-polymer having a viscosity of from 20 to 150 poises at 77° F., and an unsaturated glyceride oil in an amount between 2 and 20 per cent by weight of glyceride oil, wherein the thermal treatment of said admixture has been effected at 550 to 600° F. for 2 to 6 hours.

10. An improved process for producing a synthetic drying oil, which process comprises co-polymerizing, in aqueous emulsion, a monomeric material consisting essentially of from 50 to 100 parts by weight of 1,3-butadiene with a monomeric material consisting essentially of from 50 to 0 parts by weight of styrene at a polymerization temperature in the range 32 to 160° F., thereby producing a normally liquid, predominantly open-chain, polymeric oil having a viscosity in the range 20 to 150 poises at 77° F., removing from effluents of said polymerization such an oil so produced, admixing said oil with an unsaturated glyceride oil in the ratio from 2 to 20 per cent by weight of said polymeric oil and from 80 to 98 per cent by weight of said glyceride oil, and heating said admixture at a temperature in the range 550 to 600° F. for a time in the range 2 to 6 hours.

11. An improved process for producing a synthetic drying oil, which process comprises polymerizing, in the presence of an alkali metal catalyst, at a temperature in the range 140 to 230° F., a monomeric material consisting essentially of an open-chain conjugated diolefin thereby producing a normally liquid, predominantly open-chain polymeric oil having a viscosity in the range 20 to 150 poises at 77° F., recovering said polymeric oil, admixing said oil with an unsaturated glyceride oil in a ratio in the range 2 to 20 per cent by weight of said polymeric oil and from 80 to 98 per cent by weight of said glyceride oil, and heating said admixture at a temperature in the range 550 to 600° F., for a time in the range 2 to 6 hours.

12. An improved process for producing a synthetic drying oil, which comprises co-polymerization, in aqueous emulsion, of a monomeric material consisting essentially of 75 parts by weight of 1,3-butadiene and 25 parts by weight of styrene in the presence of 5 to 25 parts by weight of tertiary dodecyl mercaptan per 100 parts by weight of said monomeric material at a polymerization temperature of 32 to 160° F., thereby producing a normally liquid, predominantly open-chain, polymeric oil having a viscosity between 20 to 150 poises at 77° F., removing from effluents of said polymerization such an oil so produced, admixing said oil with linseed oil in the ratio between 2 to 20 per cent by weight of said polymeric oil and to 80 to 98 per cent by weight of said linseed oil, and heating said admixture to 550 to 600° F. for 2 to 6 hours.

13. An improved process for producing a synthetic drying oil, which comprises co-polymerization, in aqueous emulsion, of a monomeric material consisting essentially of 50 to 100 parts by weight of 1,3-butadiene and 50 to 0 parts by weight of styrene in the presence of 5 to 25 parts by weight of a tertiary mercaptan containing at least 10 and not more than 16 carbon atoms per molecule per 100 parts by weight of said monomeric material at a polymerization temperature such as to produce a normally liquid polymeric oil having a viscosity between 20 to 150 poises at 77° F., removing from effluents of said polymerization such an oil so produced, admixing said oil with an unsaturated glyceride oil in the ratio between 2 to 20 per cent by weight of said polymeric oil and to 80 to 98 per cent by weight of said glyceride oil, and heating said admixture to 550 to 600° F. for 2 to 6 hours.

14. The process of claim 10 wherein said unsaturated glyceride oil is soy bean oil.

15. The process of claim 11 wherein said unsaturated glyceride oil is soy bean oil.

16. The process of claim 1 in which said glyceride oil is soybean oil and said liquid hydrocarbon polymer is a polymer produced by the thermal polymerization of butadiene dissolved in normal hexane at approximately 300° F. in a closed reactor and said admixture is heated at a temperature in the range 580 to 590° F.

17. The process of claim 1 in which said admixture is heated at a temperature in the range 580 to 590° F., said glyceride oil is linseed oil, and said liquid hydrocarbon polymer is the polymer produced by heating, in a closed reactor, at 300° F., a solution of butadiene and normal hexane.

18. A drying oil according to claim 9 wherein said conjugated diolefin is butadiene and said vinyl aromatic hydrocarbon is styrene.

EDWIN G. MARHOFER.
JOHN C. HILLYER.

References Cited in the file of this patent
UNITED STATES PATENTS

| Number | Name | Date |
|---|---|---|
| 2,443,044 | Lycan et al. | June 8, 1948 |
| 2,476,341 | Weber et al. | July 19, 1949 |
| 2,523,609 | Bloch et al. | Sept. 26, 1950 |
| 2,581,413 | Hillyer et al. | Jan. 8, 1952 |